United States Patent [19]

Brumfield

[11] Patent Number: 5,421,120
[45] Date of Patent: Jun. 6, 1995

[54] FISH HOOK REMOVER

[76] Inventor: John H. Brumfield, 553 Airlane, Colorado Springs, Colo. 80929

[21] Appl. No.: 116,891

[22] Filed: Sep. 2, 1993

Related U.S. Application Data

[63] Continuation of Ser. No. 909,638, Jul. 7, 1992, abandoned.

[51] Int. Cl.$^6$ .............................................. A01K 97/00
[52] U.S. Cl. ...................................................... 43/53.5
[58] Field of Search .................. 43/535; D22/149; 294/99.2

[56] References Cited

U.S. PATENT DOCUMENTS

| | | | |
|---|---|---|---|
| 400,112 | 3/1889 | Post | D22/149 |
| 1,777,695 | 10/1930 | Jeffery | 43/53.5 |
| 2,695,471 | 11/1954 | Imberti | 43/53.5 |
| 2,757,951 | 8/1956 | Benton | 294/99.2 |
| 4,014,131 | 3/1977 | Bendik | 43/53.5 |
| 4,068,400 | 1/1978 | McCoy | 43/53.5 |

Primary Examiner—Kurt Rowan
Attorney, Agent, or Firm—Richard W. Hanes

[57] ABSTRACT

Apparatus for removing a fish hook comprising two hinged together jaws having congruent slot shaped openings in the ends thereof and an aperture close to the closed end of the slot in the bottom jaw and longitudinally aligned therewith. In operation, the jaw ends are placed together and positioned so that the open slotted openings embrace the bottom of the fish hook to exert pressure thereon to back the hook out of the flesh. Following extraction of the prong of the hook the jaws are separated, resulting in a rotation of the hook to as to introduce the prong into the aperture in the lower jaw, thus isolating the prong from further contact with anything it could penetrate during subsequent removal of the hook from the site, such as the fish's mouth.

4 Claims, 5 Drawing Sheets

U.S. Patent June 6, 1995 Sheet 1 of 5 5,421,120
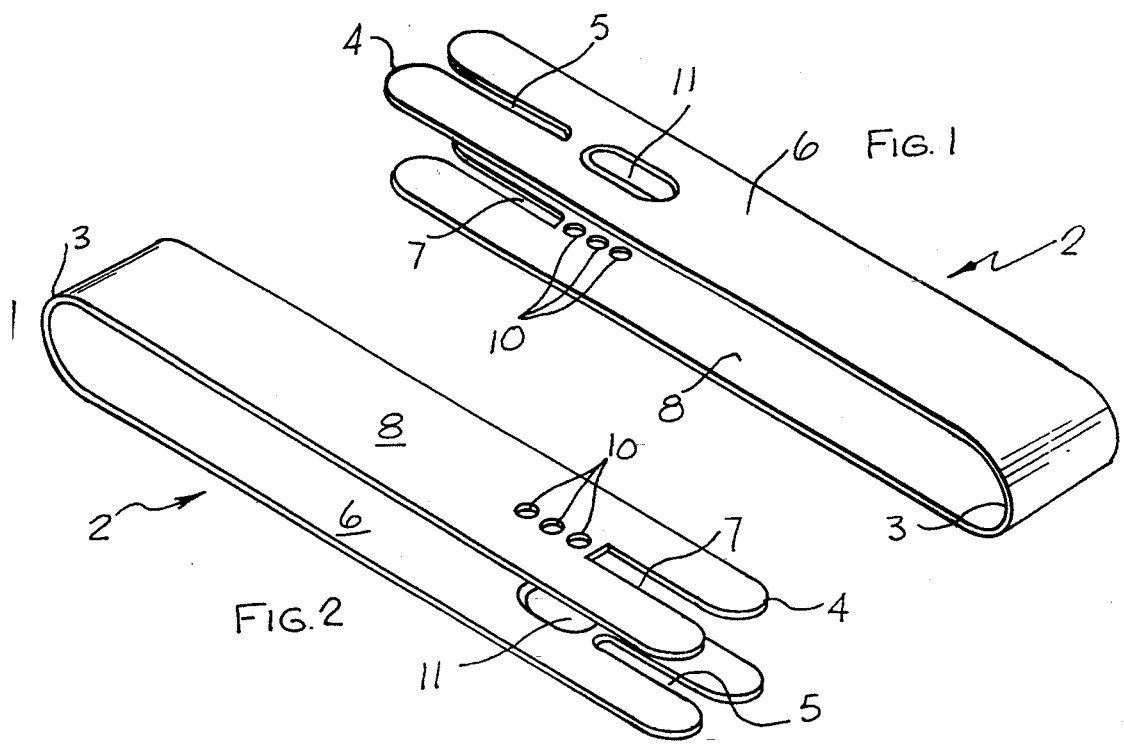
FIG. 1
FIG. 2
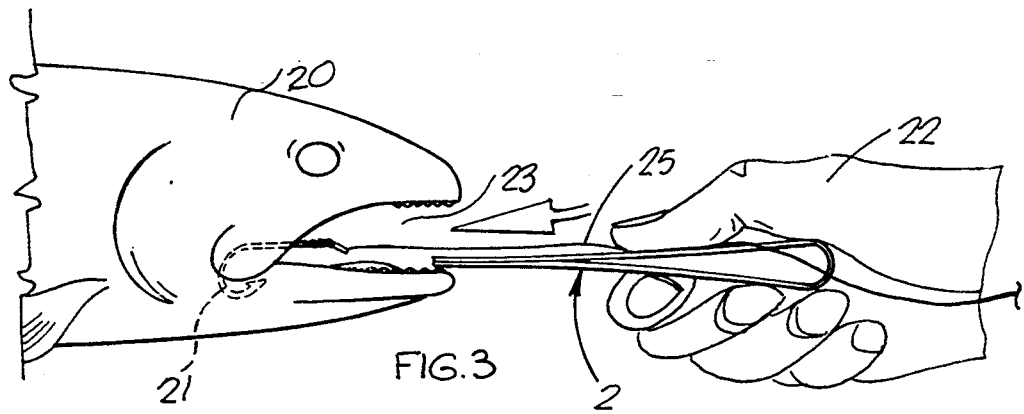
FIG. 3
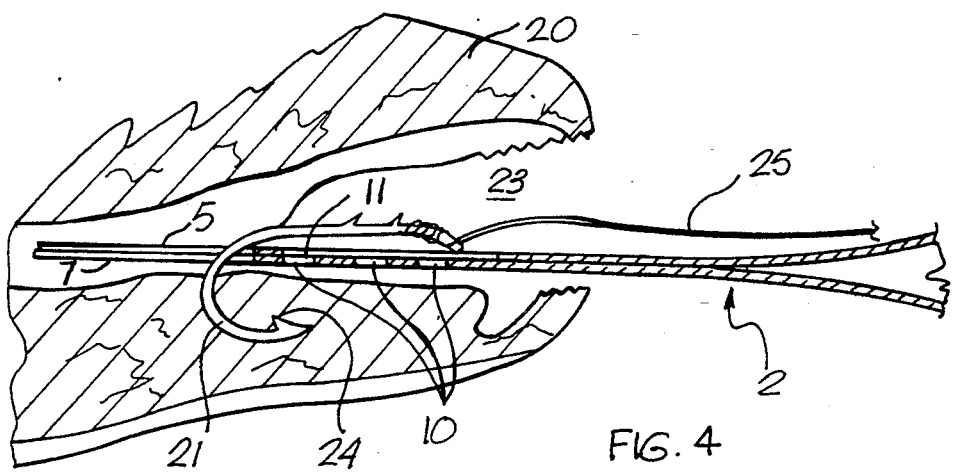
FIG. 4

5,421,120

FISH HOOK REMOVER

This application is a continuation of U.S. patent application Ser. No. 07/909,638, filed Jul. 7, 1992, abandoned.

BACKGROUND OF THE INVENTION

The invention relates to a device for removing fish hooks from a fish. Whether a fish is to be released or used for the table, the lure or bait used to catch the fish has to be removed. If the fish is very small, and a single hook is used, the hook can be removed manually by holding the fish by the gills and by applying pressure against the gills and head to partially paralyze the fish. The hook can then be manually worked out of the open mouth. If the fish is larger, or has teeth, an implement is required to remove the hook. A disgorging or unhooking implement is also used if the hook is deeply embedded in the fish.

Prior art unhooking implements include pliers of the needle-nose type and surgeon's hemostats. A forked stick or rod has also been used. Also well known is a j-shaped piece of metal which can be used to free hooks which are not deep in the fish's throat. A plastic disgorger which grasps the hook is also commercially available. The disgorger has a bulb-shaped end which aids in creating a passage for removal of the hook from the fish. The disgorger is difficult to use properly. If correctly used, it can capture the embedded hook, but it does nothing to shield the other prongs of a multipronged hook.

None of the above devices are successful in isolating and enclosing the prong portion of the hook with ease and reliability to prevent further damage to the fish during hook removal. As a result of these deficiencies, it has been necessary to use barbless hooks in catch and release sport fishing activities. The barbless hooks, however, make it more difficult to initially catch the fish. Also, it was preferable to use single-hook lures rather than the multiple-hook type. Removal of multiple hooked lures frequently result in the fisherman accidentally inserting one of the other hooks in his clothing or flesh. Also, the multiple hooks can easily snag the fish again somewhere along the removal path.

It is an object of the instant invention to provide an unhooking implement or disgorger which will remove a fish hook without allowing the hook to re-snag either the fish or the fisherman.

It is a further object of the instant invention to provide unhooking implements or disgorgers which can insulate the prong portions of either single or multiple prong hooks.

It is a further object of the invention to provide an unhooking implement which can remove a barbed hook without further damaging the fish in the process.

SUMMARY OF THE INVENTION

The invention relates to an unhooking implement or disgorger for a fish hook. The implement comprises hinged top and bottom jaws, each having a distally disposed open ended slot to receive the embedded prong of the fish hook to be removed. In a mechanically simple embodiment, both jaws are formed of a single sheet of flexible metal bent into a "U" shape forming a third class lever. At least one aperture is provided in the bottom jaw to capture the prong end of the embedded fish hook after removal from the fish. When a multiprong fish hook is to be removed, the bottom jaw is further provided with upstanding wings to shield and isolate the prongs which are not the primary subject of removal.

The invention further contemplates the method of removing an embedded prong of a fish hook from a fish. The method comprises the steps of moving the top and bottom jaws of the implement together in a compressed manner for insertion into the mouth of the fish, directing the fish hook to be removed into slots disposed at the far end of the top and bottom jaws, pushing on the jaws to remove the hook out of the flesh of the fish, releasing the jaws for movement to an expanded or open position, and isolating the prong end of the removed hook as the jaws are released so that it can be removed without further damage to the fish.

BRIEF DESCRIPTION OF THE DRAWINGS

FIG. 1 is a top view of one embodiment of the implement of the instant invention.

FIG. 2 is a bottom view of the implement of FIG. 1.

FIG. 3 is a side view of the implement of FIGS. 1 and 2 prior to contact with the hook.

FIG. 4 is a cross-sectional view showing the implement in contact with the hook to be removed.

DETAILED DESCRIPTION OF THE PREFERRED EMBODIMENT

Figure 5:
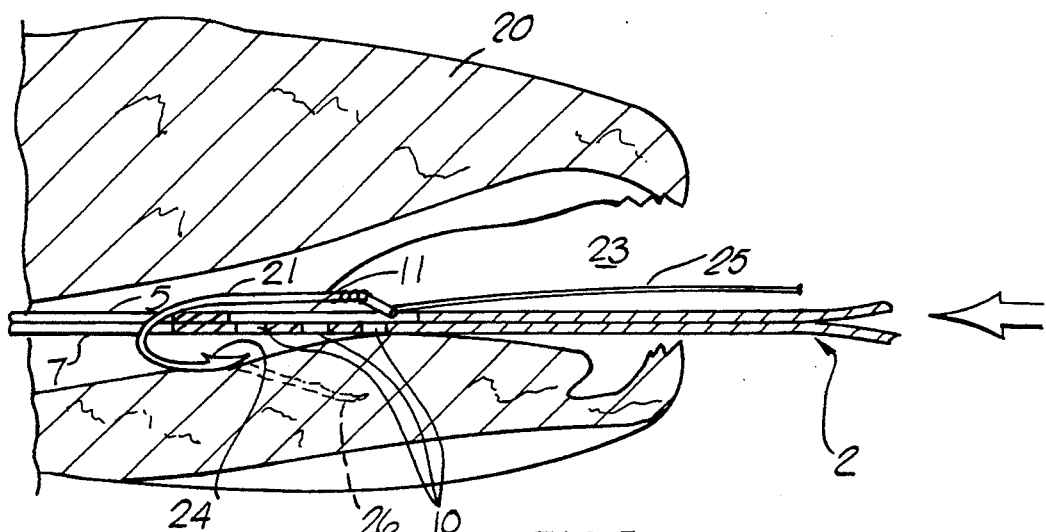
FIG. 5 is a cross-sectional view similar to FIG. 4 showing the fish hook after removal from the fish.
Figure 6:
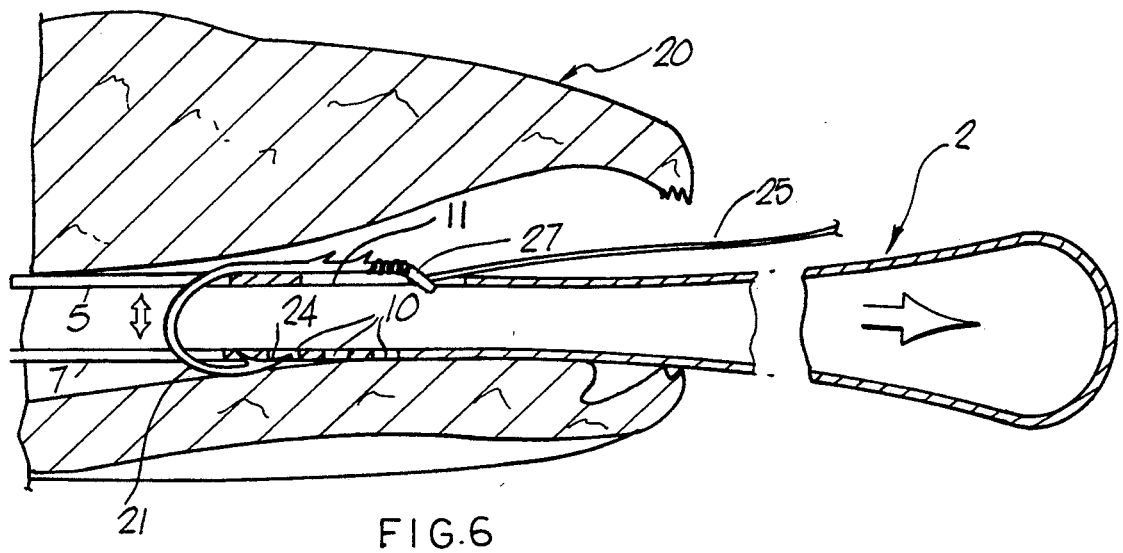
FIG. 6 is a cross-sectional view showing the implement in its released condition.

FIGS. 1 and 2 illustrate a simple single piece, "U" shaped embodiment of the unhooking implement or disgorger of the instant invention designed for removal of a single pronged hook. The implement 2 is formed of a single sheet of springable metal which is stamped and cut to the desired shape and bent at 3 to form upper jaw 6 and lower jaw 8. The upper jaw 6 is provided, at its distal end, with a hook receiving open ended notch or slot 5 while the lower jaw 8 has a companion hook receiving open ended notch or slot 7. Both jaws have rounded ends such as that shown at 4 in order to provide smooth access into a fish's mouth. An aperture 11 is provided in the top jaw 6 to accommodate the end portion of a captured hook as will be later described. Holes or apertures 10 are also provided for reception of the top or prong portion of the hook to be removed.

The method of hook removal will now be described with particular reference to FIGS. 3-8. Initially, the two jaws 6 and 8 of the implement are squeezed together against the normal spring pressure of the "U" shape by a user's hand 22, as shown in FIG. 3, for insertion in the mouth 23 of the fish 20. The implement 2 is directed by the user so that the companion slots 5 and 7 straddle the bottom portion of the hook 27. The user then presses the implement 2 further into the fish's mouth and against the bottom of the hook to extricate the hook prong 24 from its embedded position (shown in phantom at 26) in the fish. After extraction of the hook prong 24 from the flesh of the fish, the user then releases the compression force on the jaws 6 and 8, allowing them to spring apart to a position determined by the dimensions of the fish's mouth. As a result of the separating of the distal ends of the jaws 6 and 8, the upper jaw 8 applies pressure to the shank 21 of the hook, serving to slightly rotate the hook and position the prong of the fish hook in one of the holes 10, as determined by the size of the hook. See FIG. 8 for a more illustrative view. Once the sharp prong 24 is safely positioned in one of the holes 10 so that the end of the prong is between the jaws 6 and 8 the implement 2 can be smoothly withdrawn from the fish's mouth without snagging or rehooking the prong as it is taken out of the fish's mouth.

Figure 7:
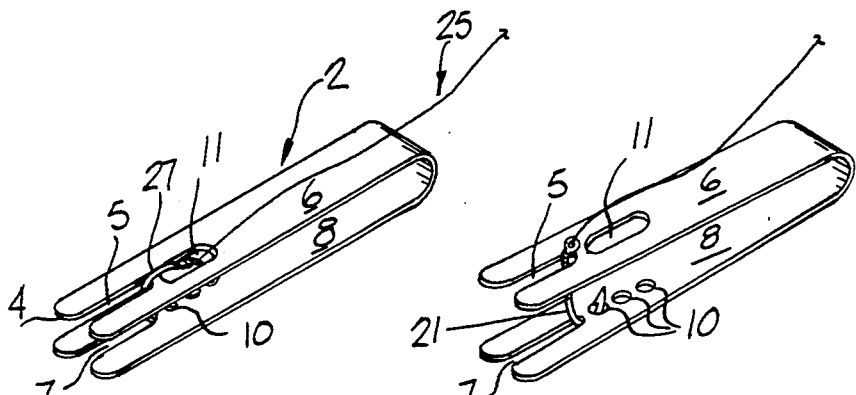
FIG. 7 is a top view showing the implement and the hook.
Figure 8:
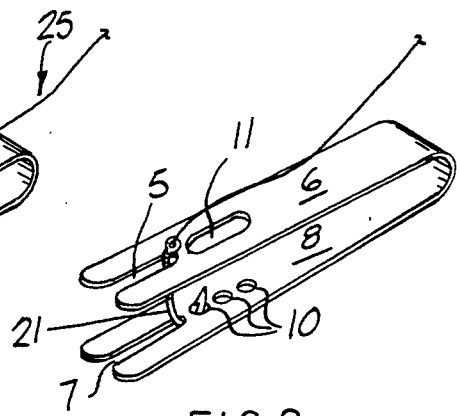
FIG. 8 is a top view showing the implement in its released position along with a captured hook.

As shown in FIG. 7, the slot 11 provides room to accommodate the eye portion of the hook prior to the opening of the implement jaws and the rotation of the hook to its "captured" or "insulated" position, as shown in FIG. 8.

Figure 12:
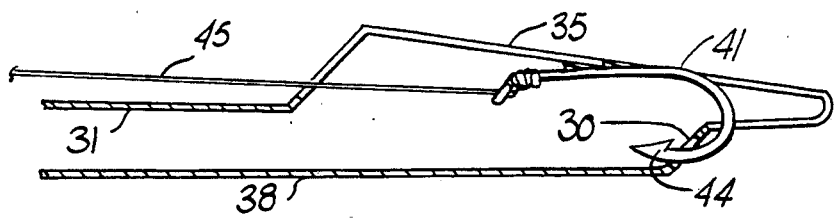
FIG. 12 is a cross-sectional side view of the implement after hook removal.
Figure 13:
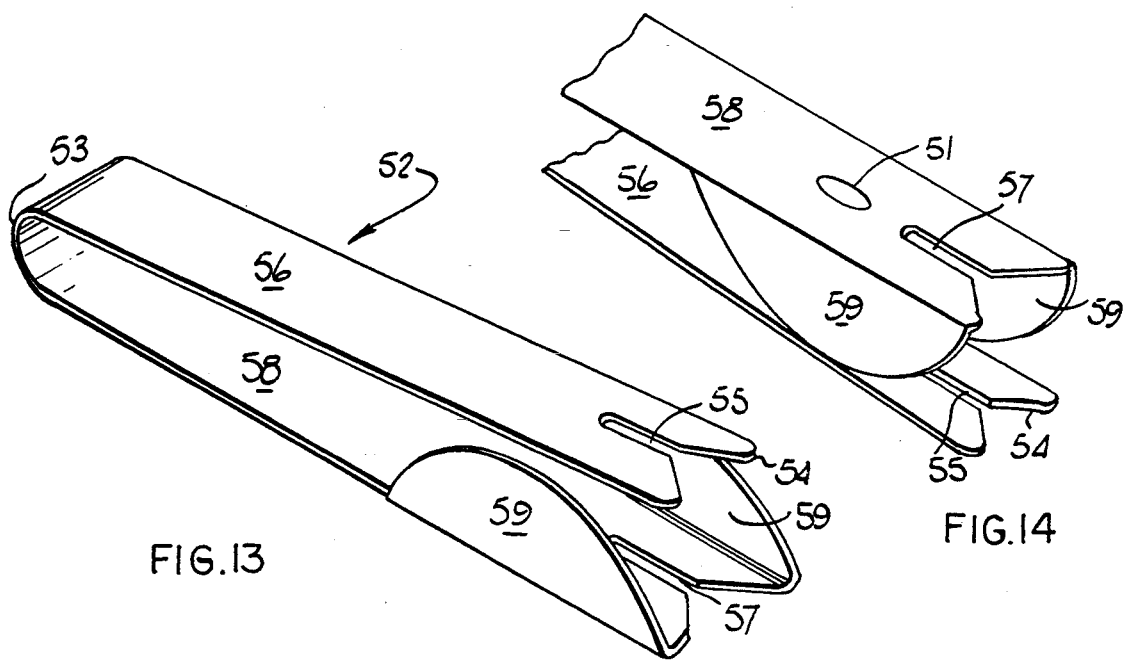
FIG. 13 is a top view of a further embodiment of the implement of the instant invention.
Figure 14:
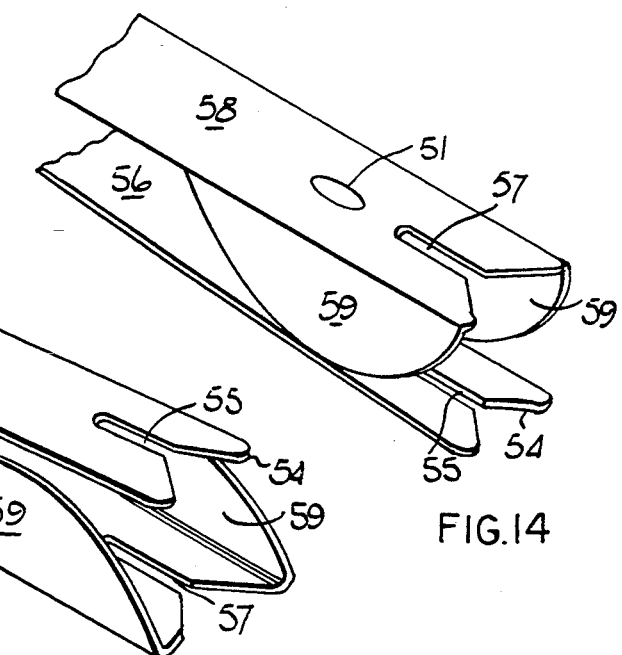
FIG. 14 is a bottom view of the implement of FIG. 13.

FIGS. 9-12 illustrate an alternative embodiment which can be also stamped, cut and formed out of a single sheet of metal. The spring metal "U" shaped unhooking implement 32 comprises a top jaw 36 bent to form finger depressing portion 31 for ease of insertion in the fish's mouth. A slot 35 extends from the top jaw 36 around the "U" bend to the bottom jaw 38. The bottom jaw is bent and angled to provide for the hook accommodating aperture 30, similar in purpose to the apertures 10 in the first described embodiment. When the implement 32 is inserted in the fish's mouth 40, notch end 37 of slot 35 is adapted to engage the bottom curvature of the hook, urging the prong 44 of the hook 41 out of the flesh. This embodiment of the invention is well adapted for large hooks because the long shank of the hook can be made to lie down within the sides of the elongated slot 35, especially with slight tension on the leader 45. As seen in FIG. 12, tension on the leader 45 causes the hook to rotate slightly, positioning the prong 44 into the aperture 30 and virtually enclosing the pointed end of the hook to prevent snagging or rehooking as the implement is withdrawn from the fish's mouth.

Figure 15:
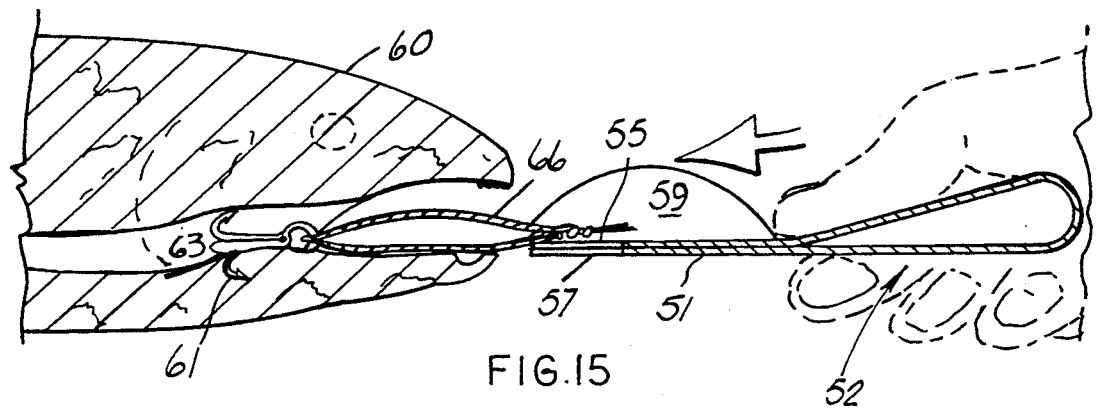
FIG. 15 is a cross-sectional side view of the implement of FIGS. 13 and 14, along with a hooked fish.
Figure 16:
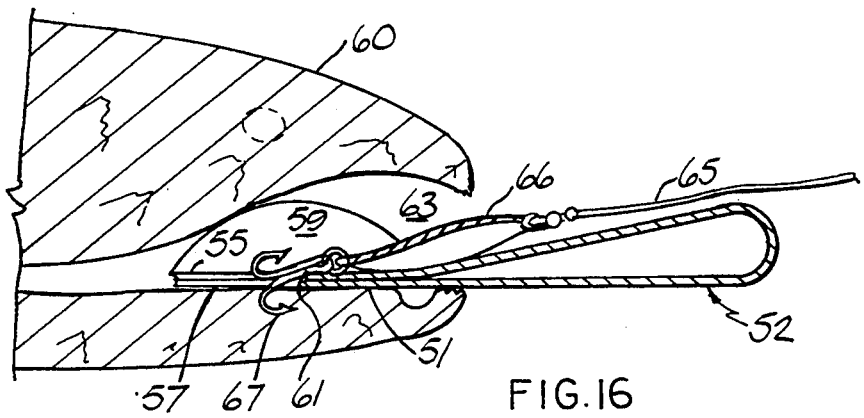
FIG. 16 is a cross-sectional view similar to FIG. 15 during hook removal.
Figure 17:
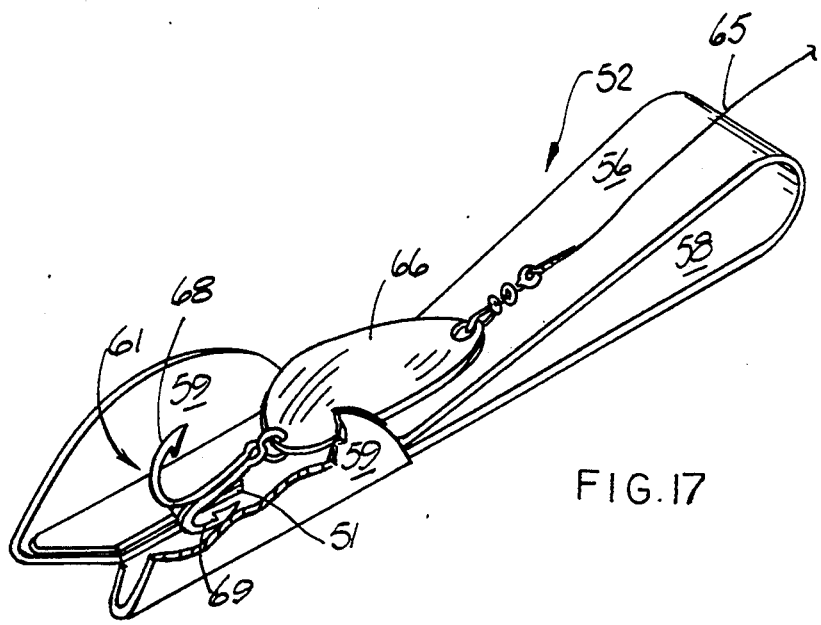
FIG. 17 is a top view of the implement of FIGS. 13–16 along with the fish hook to be removed.

The embodiment of FIGS. 13-17 is particularly useful to remove a multi-prong fish hook, such as the typical three hook lure. This embodiment is also formed from a single sheet of springable steel which has been stamped, cut and bent to shape. The top jaw 56 has an open ended slot 55 and the bottom jaw 58 has companion open ended slot 57. Wings 59 are bent upward from the bottom jaw to shield the two hooks which are not embedded. The hook removal operation is as shown in FIGS. 15-17. To remove hook 61 from the mouth 63 of the fish 60, the two jaws 56 and 58 are squeezed together by the user 52 (shown in phantom), as shown in FIG. 15. The implement is then inserted in the fish's mouth 63. The prong 67 of the hook that has pierced the flesh of the fish is guided into the slots 55 and 57. The other two hook portions 68 and 69 become positioned on the top surface of the upper jaw 56 and are shielded from the top and sides of the fish's mouth by the upstanding side wings 59. When the user releases the compression force holding the jaws 56 and 58 tightly together for the purpose of sliding the hook out of the flesh, the hook is slightly rotated, positioning the prong end of the hook into a protected position in the slot 51 in the bottom jaw, enabling the implement and the hook to be easily withdrawn.

Figure 18:
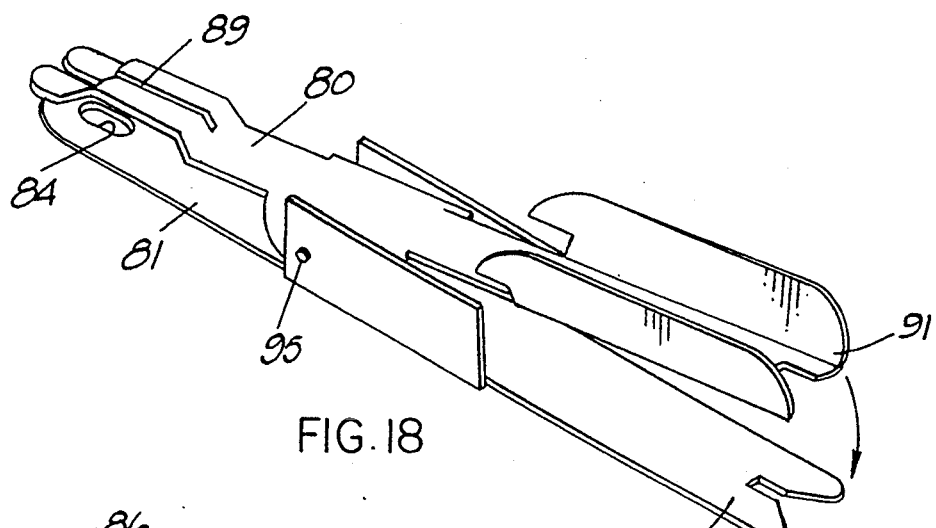
FIG. 18 is a perspective view of a preferred embodiment of the invention formed in the manner of a Class 1 lever where the hinge axis is intermediate of the two ends and where the jaws of the embodiment are substantially closed.
Figure 19:
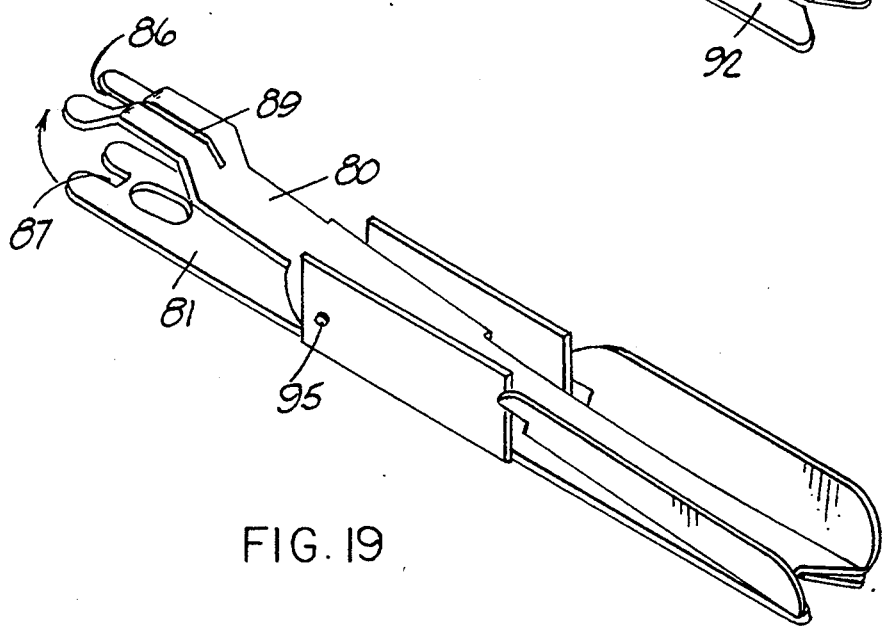
FIG. 19 is a view similar to that of FIG. 18 except that the jaws are shown in the open position.
Figure 20:
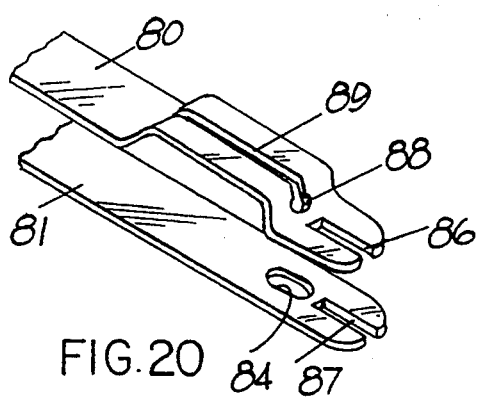
FIG. 20 is a fragmentary perspective view of the distal ends of the top and bottom jaws of the embodiment of FIGS. 18 and 19.
Figure 21:
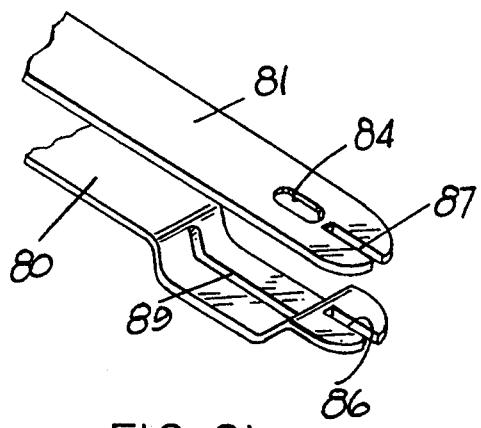
FIG. 21 is a view similar to that of FIG. 20 except that the jaws are upside down from that position shown in FIG. 20.

The preferred form of the invention is seen in FIGS. 18 and 19 where the jaws 80 and 81 are hinged at a point intermediate their ends, forming a lever of the first class. As a practical matter this embodiment allows for a construction in which two different types of implement may be constructed in the same device, that is a single hook remover on the one end and a multiple hook remover, with the wing protection on the other.

Figure 9:
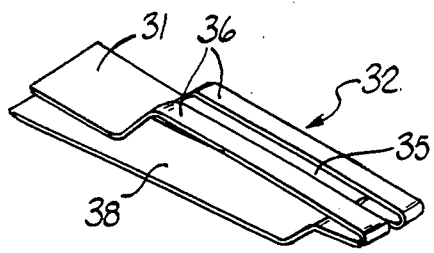
FIG. 9 is a top view of a further embodiment of the implement of the instant invention.
Figure 10:
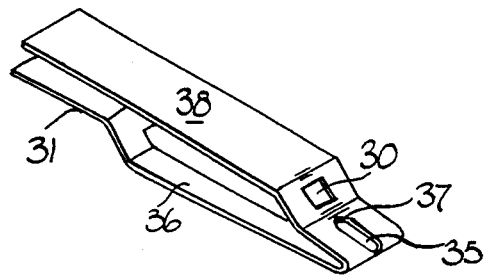
FIG. 10 is a bottom view of the implement of FIG. 9.
Figure 11:
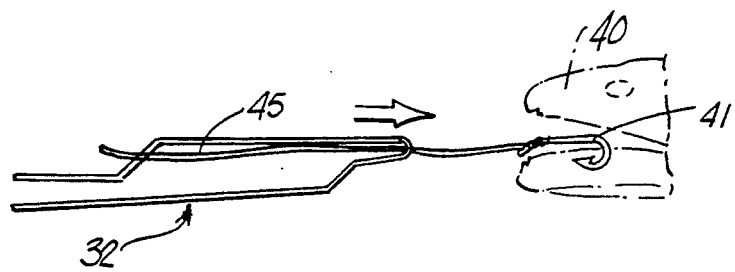
FIG. 11 is a side view of the implement of FIGS. 9 and 10 along with a hooked fish shown in phantom.

The single hook remover of this preferred embodiment is noted to be somewhat different than that disclosed in either the FIG. 8 or the FIG. 9 single hook embodiments, illustrating the many variations in the design which will accommodate hooks of different sizes and configurations. In this preferred embodiment the bottom jaw 81 is provided with an elongated prong receiving aperture 84 that will oblige hooks of many different sizes. For a similar purpose, a portion of the top jaw 80 which is just behind the hook engaging congruent slots 86 and 87 is provided with a longitudinal slot 89 at the front edge of which is an enlarged opening 88. In operation, the jaws 80 and 81 are closed, in the manner of the other embodiments, and the implement is inserted beneath the exposed shank of the hook until the bottom of the hook is located between the sides of the mating guide slots 86 and 87 and is engaged by the proximal closed ends of the slots. The leader eye at the top of the hook shank will have been introduced into the large opening 88 and the shank and the eye will lie just beneath the top jaw slot 89 with the line leader emerging through the slot and back across the top of the jaw 80. Further rearward pressure extracts the hook from the flesh at which time the jaws are slightly opened by closing pressure on the handles 91 and 92 which are formed by extensions of the jaws 80 and 81 respectively on the other side of the hinge point 95. As in the other embodiments, the separation of the distal end of the jaws causes an upward pressure on the shank of the hook and rotates the hook sufficiently to turn the pointed prong of the hook into the aperture 84 in the bottom jaw where it is protected from further engagements with the flesh of the fish during withdrawal of the instrument from the fish's mouth.

I claim:

1. An apparatus for removing an embedded fish hook having at least one prong end and an eye comprising;
   a pair of springable hinged top and bottom jaws, said top jaw having a first end and a second end hinged to said bottom jaw, said bottom jaw having a first end and a second end hinged to said top jaw,
   a longitudinal open ended slot in the first ends of each jaw such that said slots overlay each other,
   an aperture disposed in said top jaw proximate to and longitudinally aligned with said slot in the top jaw,
   a plurality of holes disposed in said bottom jaw proximate to and longitudinally aligned with said slot in said bottom jaw, wherein with the jaws compressed, the shank of the fish hook to be removed is directed into said slots and the eye of the embedded fish hook resides in said aperture such that the prong end of the embedded fish hook is guided into one of said holes when the jaws are released.

2. The implement of claim 1 wherein said top and bottom jaws are formed of springable flexible material bent into a substantial "U" shape.

3. The apparatus of claim 1 wherein said implement further comprises upstanding wing means on one of said jaws to shield the fish hook to be removed, said wing means being of sufficient size to shield a fish hook having a plurality of prong ends.

4. The implement of claim 3 wherein said wing means is attached to said bottom jaw.

* * * * *